United States Patent
Luizello et al.

(10) Patent No.: US 12,311,258 B2
(45) Date of Patent: May 27, 2025

(54) IMPAIRED PLAYER ACCESSABILITY WITH OVERLAY LOGIC PROVIDING HAPTIC RESPONSES FOR IN-GAME EFFECTS

(71) Applicants: Sony Interactive Entertainment LLC, San Mateo, CA (US); Sony Interactive Entertainment Inc., Tokyo (JP)

(72) Inventors: Alessandra Luizello, San Mateo, CA (US); Steven Osman, San Mateo, CA (US)

(73) Assignees: Sony Interactive Entertainment LLC, Tokyo (JP); Sony Interactive Entertainment Inc., Tokyo (JP)

( * ) Notice: Subject to any disclaimer, the term of this patent is extended or adjusted under 35 U.S.C. 154(b) by 305 days.

(21) Appl. No.: 17/875,330

(22) Filed: Jul. 27, 2022

(65) Prior Publication Data

US 2024/0033619 A1    Feb. 1, 2024

(51) Int. Cl.
*A63F 13/285* (2014.01)
*A63F 13/67* (2014.01)
*A63F 13/79* (2014.01)
*G06N 20/00* (2019.01)

(52) U.S. Cl.
CPC ............ *A63F 13/285* (2014.09); *A63F 13/67* (2014.09); *A63F 13/79* (2014.09); *G06N 20/00* (2019.01); *A63F 2300/1037* (2013.01)

(58) Field of Classification Search
CPC ........ A63F 13/285; A63F 13/67; A63F 13/79; A63F 20/00; A63F 2300/1037; A63F 13/215; A63F 13/60
USPC .......................................................... 463/37
See application file for complete search history.

(56) References Cited

U.S. PATENT DOCUMENTS

| | | | |
|---|---|---|---|
| 8,073,676 B2 | 12/2011 | Sargaison et al. | |
| 10,086,272 B2* | 10/2018 | Mahlmeister | A63F 13/22 |
| 10,279,264 B1* | 5/2019 | Aghdaie | A63F 13/67 |
| 10,395,428 B2* | 8/2019 | Stafford | G02B 27/017 |
| 2003/0109296 A1* | 6/2003 | Leach | A63F 13/52 463/6 |
| 2009/0079690 A1 | 3/2009 | Watson et al. | |
| 2016/0184703 A1* | 6/2016 | Brav | A63F 13/213 463/30 |
| 2017/0358141 A1* | 12/2017 | Stafford | G06T 7/246 |
| 2018/0001198 A1* | 1/2018 | Frappiea | A63F 13/2145 |
| 2018/0196520 A1 | 7/2018 | Saboune et al. | |
| 2019/0102939 A1* | 4/2019 | He | A63F 13/65 |

(Continued)

OTHER PUBLICATIONS

Intl Search Report & Written Opinion, PCT/US2023/069996, Oct. 30, 2023, 12 pages.

*Primary Examiner* — Pierre E Elisca
(74) *Attorney, Agent, or Firm* — Kilpatrick, Townsend & Stockton LLP

(57) ABSTRACT

A method including executing game logic of a video game to generate a plurality of video frames for a game play of the video game by a player, wherein game state data is generated during the executing the game logic. The method including identifying an effect that is generated for at least one video frame in the plurality of video frames based on the game state data. The method including translating the effect to a haptic response presentable to the player simultaneous with the at least one video frame, wherein the haptic response is communicating a gaming experience that is rendered by the effect in the at least one video frame.

20 Claims, 5 Drawing Sheets

(56) References Cited

U.S. PATENT DOCUMENTS

| | | | |
|---|---|---|---|
| 2019/0240579 A1* | 8/2019 | Drouin | A63F 13/69 |
| 2019/0355225 A1 | 11/2019 | Khoshkava et al. | |
| 2019/0371075 A1* | 12/2019 | Stafford | G06F 3/0482 |
| 2021/0275922 A1* | 9/2021 | Starich | A63F 13/335 |
| 2021/0402292 A1* | 12/2021 | Chow | A63F 13/285 |

* cited by examiner

310 Translation Function

230A

| HR / Effect | Haptic Response 1 | Haptic Response 2 | Haptic Response 3 | Haptic Response 4 | ... | Haptic Response N |
|---|---|---|---|---|---|---|
| Effect 1 | | HR 2 | | | ... | |
| Effect 2 | HR 1 | | HR 3 | | ... | |
| Effect 3 | | HR 2 | HR 3 | HR 4 | ... | |
| Effect 4 | | | | | ... | |
| Effect 5 | | HR 2 | HR 3 | | ... | |
| Effect 6 | | | | | ... | |
| ... | | | | | ... | |
| Effect N | | | HR 3 | | ... | HR N |
| Filter Function (260A) | +3 | +5 | --/0 | --/0 | ... | 1 |
| Adjusting Function (240A) | 1 | 1 | 0 | 0 | ... | +1 |

320 · 350

IMPAIRED PLAYER ACCESSABILITY WITH OVERLAY LOGIC PROVIDING HAPTIC RESPONSES FOR IN-GAME EFFECTS

TECHNICAL FIELD

The present disclosure is related to gaming, and more specifically to providing overlay logic supporting a game engine to provide haptic responses for in-game effects in order to communicate gaming experiences that are rendered and/or triggered by the in-game effects. In that manner, a physically impaired player may enjoy a game experience through a haptic response that is similar to the game experience of a non-impaired player given a corresponding in-game effect. Also, artificial intelligence models can be built for players so that haptic responses can be personalized to each player, such that a personalized haptic response is translated for a corresponding in-game effect for a corresponding player.

BACKGROUND OF THE DISCLOSURE

Video games and/or gaming applications and their related industries (e.g., video gaming) are extremely popular and represent a large percentage of the worldwide entertainment market. Video games are played anywhere and at any time using various types of platforms, including gaming consoles, desktop or laptop computers, mobile phones, etc.

Video games are known to provide an immersive experience to players. For example, a video game may provide audio effects in a given scene to accentuate the experience of the player. However, a hearing impaired player may be unable to fully experience and/or appreciate the audio effects. As a result, the hearing impaired player will not have the same experience playing the video game as a non-impaired player. For example, the hearing impaired player may not feel the same urgency when playing the video game through a scene as a non-impaired player that is able to hear the audio effects.

It would be desirable to increase accessibility of video games to impaired players, so that impaired players would have the same or similar experiences as non-impaired players when playing the video games.

It is in this context that embodiments of the disclosure arise.

SUMMARY

Embodiments of the present disclosure relate to providing overlay logic supporting a game engine to provide haptic responses for in-game effects in order to communicate a gaming experience that is rendered and/or triggered by the in-game effects. For example, an in-game sound effect may be translated into a haptic response that is actuated in a user device simultaneous with one or more video frames including the sound effect. In that manner, a hearing impaired player may enjoy a game experience given by the haptic response that is similar to the game experience of a non-impaired player hearing the sound effect.

In one embodiment, a method is disclosed. The method including executing game logic of a video game to generate a plurality of video frames for a game play of the video game by a player, wherein game state data is generated during the executing the game logic. The method including identifying an effect that is generated for at least one video frame in the plurality of video frames based on the game state data. The method including translating the effect to a haptic response presentable to the player simultaneous with the at least one video frame. The haptic response is communicating a gaming experience that is rendered by the effect in the at least one video frame.

In another embodiment, a non-transitory computer-readable medium storing a computer program for implementing a method is disclosed. The computer-readable medium including program instructions for executing game logic of a video game to generate a plurality of video frames for a game play of the video game by a player, wherein game state data is generated during the executing the game logic. The non-transitory computer-readable medium including program instructions for identifying an effect that is generated for at least one video frame in the plurality of video frames based on the game state data. The non-transitory computer-readable medium including program instructions for translating the effect to a haptic response presentable to the player simultaneous with the at least one video frame. The haptic response is communicating a gaming experience that is rendered by the effect in the at least one video frame.

In still another embodiment, a computer system is disclosed, wherein the computer system includes a processor and memory coupled to the processor and having stored therein instructions that, if executed by the computer system, cause the computer system to execute a method. The method including executing game logic of a video game to generate a plurality of video frames for a game play of the video game by a player, wherein game state data is generated during the executing the game logic. The method including identifying an effect that is generated for at least one video frame in the plurality of video frames based on the game state data. The method including translating the effect to a haptic response presentable to the player simultaneous with the at least one video frame. The haptic response is communicating a gaming experience that is rendered by the effect in the at least one video frame.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIG. 3 is a chart illustrating the translation of in-game effects to haptic responses, and the application of filter and adjuster functions when implementing overlay logic supporting a game engine to provide haptic responses for in-game effects in order to communicate gaming experiences that are rendered by the in-game effects, in accordance with one embodiment of the disclosure.

DETAILED DESCRIPTION

Figure 1:
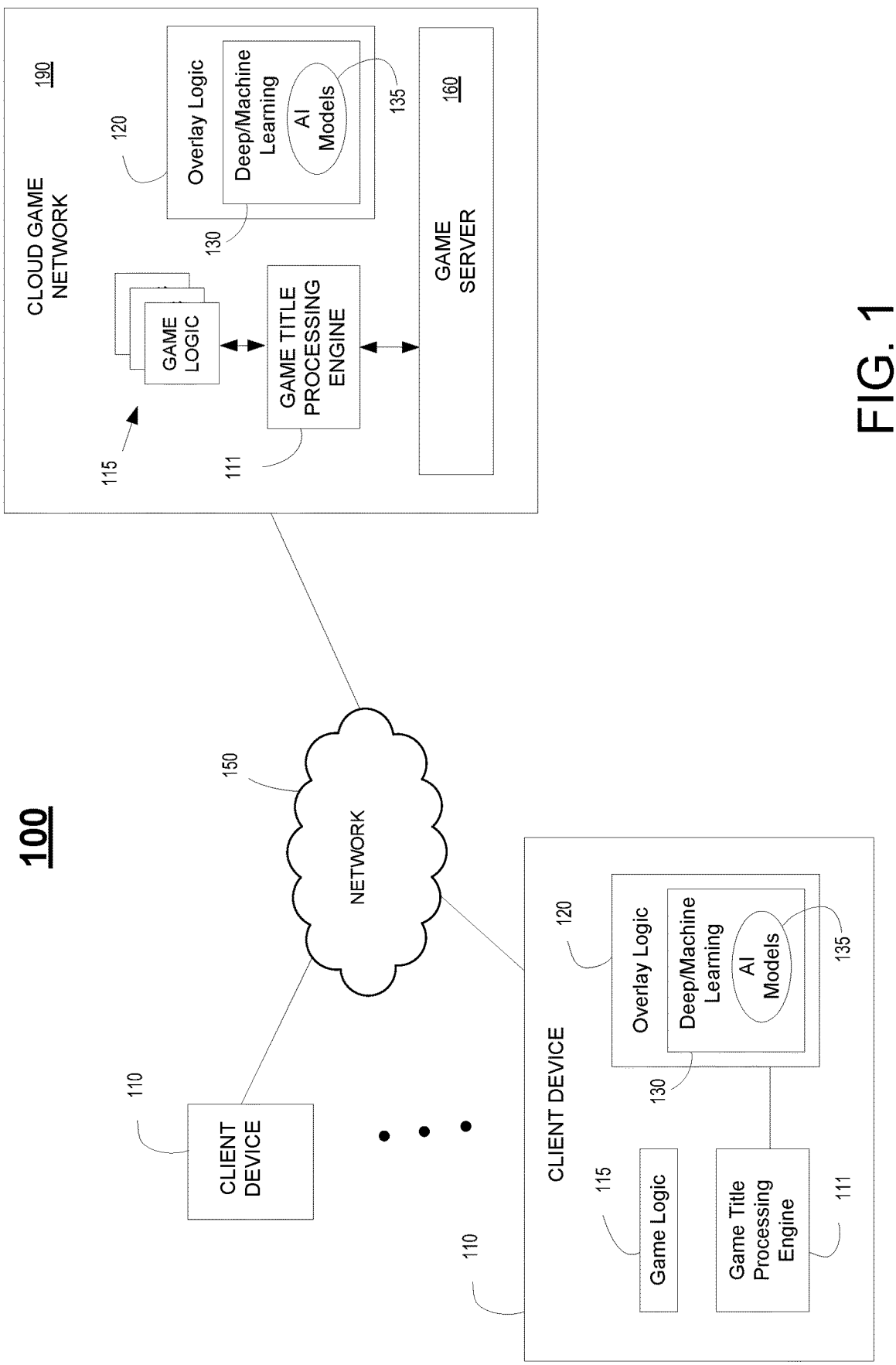
FIG. 1 illustrates a system including overlay logic supporting a game engine to provide haptic responses for in-game effects in order to communicate gaming experiences that are rendered by the in-game effects, in accordance with one embodiment of the disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods providing overlay logic supporting a game engine to provide haptic responses for in-game effects in order to communicate a gaming experience that is rendered and/or triggered by the in-game effects. The haptic responses given for in-game effects may be personalized to each user. In that manner, a player that may be impaired in receiving an intended gaming experience when playing a video game can receive a full gaming experience through the use of haptic responses substituted for or in support of in-game effects of a video game. Player impairment may be physical, such as being hearing impaired, or being bothered by too many distractions from in-game effects (e.g., visual or sound, etc.), and others. For example, in-game sound effects may be overlaid with corresponding haptic responses or haptic feedback, when the haptic responses were not part of the original video game. That is, an in-game sound effect may be translated into a haptic response that is actuated in a user device simultaneous with one or more video frames including the sound effect. In that manner, a hearing impaired player may enjoy a gaming experience given by the haptic response that is similar to the gaming experience of a non-impaired player hearing the sound effect. For illustration, a sound effect in a video game may provide a specific gaming experience to players, such as directing players to emotionally react in a certain manner, or even to perform certain actions. That sound effect can be translated into a corresponding haptic response that gives the same or similar gaming experience. Further, when too much haptic responses are occurring simultaneously for a particular player, selective ones of those haptic responses may be turned off so as to selectively focus on certain other haptics. This selection and/or prioritization of haptic responses may be personalized to each player. That is, haptic responses may be turned on or off depending on the use case or game context occurring during a corresponding video game. In that manner, this will allow a player to prioritize the use of selective haptic responses in order to focus on selective types of information that are important to that player without getting confused by or being inundated with the other experiences that are triggered by unselected haptic responses. Also, artificial intelligence (AI) techniques may be implemented to provide personalized haptic responses for corresponding in-game effects for each player. In particular, AI models of the players may be built that are configured for predicting which haptic responses are suitable for corresponding in-game effects as preferred by each player.

Advantages of the methods and systems configured to providing overlay logic supporting a game engine to provide haptic responses for in-game effects in order to communicate a gaming experience that is rendered by the in-game effects include providing alternative avenues for communicating gaming experiences that are generated from playing video games. As a result, players of video games that may be somehow impaired from having a full gaming experience may now have the same or similar gaming experience as the unimpaired players. In that manner, video games may be made accessible to those impaired players that otherwise may decline to play those video games. Moreover, other advantages include having the gaming experience of a player be enhanced through personalized selection and/or translation of in-game effects and/or their translated haptic responses. That is, the gaming experience of a player is enhanced by providing haptic responses that trigger desired gaming experiences for in-game effects. Instead of having a gaming experience that is designed by a game developer, the gaming experience of a player may be more intense, or less intense, or even different depending on the personalized selection of haptic responses translated and actuated for corresponding in-game effects.

Throughout the specification, the reference to "game" or "video game" or "gaming application" is meant to represent any type of interactive application that is directed through execution of input commands. For illustration purposes only, an interactive application includes applications for gaming, word processing, video processing, video game processing, etc. Also, the terms "virtual world" or "virtual environment" or "metaverse" is meant to represent any type of environment generated by a corresponding application or applications for interaction between a plurality of users in a multi-player session or multi-player gaming session. Further, the terms introduced above are interchangeable.

With the above general understanding of the various embodiments, example details of the embodiments will now be described with reference to the various drawings.

FIG. 1 illustrates a system 100 including overlay logic 120 supporting a game engine 111 to provide haptic responses for in-game effects in order to communicate a gaming experience that is rendered and/or triggered by the in-game effects, in accordance with one embodiment of the disclosure. The overlay logic 120 may be implemented to provide alternative avenues for gaining gaming experiences for a video game, such as through haptic responses that are translated from in-game effects that are intended to render and/or trigger those gaming experiences. In another example, the overlay logic is able to build and/or implement artificial intelligence (AI) models that can predict and/or provide haptic responses for in-game effects that may be preferred or desired by the corresponding players. In that manner, the application of haptic responses for in-game effects may be personalized to each player through corresponding AI models.

As shown, system 100 may providing gaming over a network 150 for and between one or more client devices 110. In particular, system 100 may be configured to provide gaming to users participating in single player or multi-player gaming sessions via a cloud game network 190, wherein the video game can be executed locally (e.g., on a local client device of a corresponding user) or can be executed remote from a corresponding client device 110 (e.g., acting as a thin client) of a corresponding user that is playing the video game, in accordance with one embodiment of the present disclosure. In at least one capacity, the cloud game network 190 supports a multi-player gaming session for a group of users, to include delivering and receiving game data of players for purposes of coordinating and/or aligning objects and actions of players within a scene of a gaming world or metaverse, managing communications between user, etc. so that the users in distributed locations participating in a multi-player gaming session can interact with each other in the gaming world or metaverse in real-time.

In particular, system 100 may provide gaming control to one or more users playing one or more applications (e.g., video games) either through local instances operating on client devices or through cloud based instances operating in the cloud game network 190 via network 150 in one or more gaming session. Network 150 may include one or more communication technologies, including $5^{th}$ Generation (5G) network technology having advanced wireless communication systems (e.g., cellular network technology). In some embodiments, the cloud game network 190 may include a plurality of virtual machines (VMs) running on a hypervisor of a host machine, with one or more virtual machines configured to execute a game processor module utilizing the hardware resources available to the hypervisor of the host. It should be noted, that access services, such as providing access to games of the current embodiments, delivered over a wide geographical area often use cloud computing. Cloud computing is a style of computing in which dynamically scalable and often virtualized resources are provided as a service over the internet.

As shown, the cloud game network 190 includes a game server 160 that provides access to a plurality of video games. Video games played in a corresponding single-player or multi-player session may be played over the network 150 with connection to the game server 160. For example, in a multi-player session involving multiple instances of an application (e.g., generating virtual environment, gaming world, metaverse, etc.), a dedicated server application (session manager) collects data from users and distributes it to other users so that all instances are updated as to objects, characters, etc. to allow for real-time interaction within the virtual environment of the multi-player session, wherein the users may be executing local instances or cloud based instances of the corresponding application. Game server 160 may be any type of server computing device available in the cloud, and may be configured as one or more virtual machines executing on one or more hosts. For example, game server 160 may manage a virtual machine supporting a game processor that instantiates a cloud based instance of an application for a user. As such, a plurality of game processors of game server 160 associated with a plurality of virtual machines is configured to execute multiple instances of one or more applications associated with gameplays of a plurality of users. In that manner, back-end server support provides streaming of media (e.g., video, audio, etc.) of gameplays of a plurality of applications (e.g., video games, gaming applications, etc.) to a plurality of corresponding users. That is, game server 160 is configured to stream data (e.g., rendered images and/or frames of a corresponding gameplay) back to a corresponding client device 110 through network 150. In that manner, a computationally complex gaming application may be executing at the back-end server in response to controller inputs received and forwarded by client device 110. Each server is able to render images and/or frames that are then encoded (e.g., compressed) and streamed to the corresponding client device for display.

In single-player or multi-player gaming sessions, instances of an application may be executing locally on a client device 110 or at the cloud game network 190. In either case, the application as game logic 115 is executed by a game engine 111 (e.g., game title processing engine). For purposes of clarity and brevity, the implementation of game logic 115 and game engine 111 is described within the context of the cloud game network 190. In particular, the application may be executed by a distributed game title processing engine (referenced herein as "game engine"). In particular, game server 160 and/or the game title processing engine 111 includes basic processor based functions for executing the application and services associated with the application. For example, processor based functions include 2D or 3D rendering, physics, physics simulation, scripting, audio, animation, graphics processing, lighting, shading, rasterization, ray tracing, shadowing, culling, transformation, artificial intelligence, etc. In that manner, the game engines implement game logic, perform game calculations, physics, geometry transformations, rendering, lighting, shading, audio, as well as additional in-game or game-related services. In addition, services for the application include memory management, multi-thread management, quality of service (QoS), bandwidth testing, social networking, management of social friends, communication with social networks of friends, social utilities, communication channels, audio communication, texting, messaging, instant messaging, chat support, game play replay functions, help functions, etc.

Users access the remote services with client devices 110, which include at least a CPU, a display and input/output (I/O). For example, users may access cloud game network 190 via communications network 150 using corresponding client devices 110 configured for updating a session controller (e.g., delivering and/or receiving user game state data), receiving streaming media, etc. The client device 110 can be a personal computer (PC), a mobile phone, a netbook, a personal digital assistant (PAD), handheld device, etc.

In one embodiment, client device 110 may be configured with a game title processing engine and game logic for at least some local processing of an application, and may be further utilized for receiving streaming content as generated by the application executing at a back-end server, or for other content provided by back-end server support. In still other embodiments, for independent local processing, the game title processing engine 111 at the client device 110 includes basic processor based functions for executing an application and services associated with the application, as previously described. For local processing, the game logic 115 is stored on the local client device 110 and is used for executing the application. For example, an instance of an application is executing by the game title processing engine 111 of a corresponding client device 110. Game logic 115 (e.g., executable code) implementing the application is stored on the corresponding client device 110, and is used to execute the application. For purposes of illustration, game logic 115 may be delivered to the corresponding client device 110 through a portable medium (e.g. optical media) or through a network (e.g., downloaded through the internet from a gaming provider).

In one embodiment, client device 110 may be configured as a thin client providing interfacing with a back end server (e.g., game server 160 of cloud game network 190) configured for providing computational functionality (e.g., including game title processing engine 111). In particular, client device 110 of a corresponding user (not shown) is configured for requesting access to applications over a communications network 150, such as the internet, and for rendering for display images generated by a video game executed by the game server 160, wherein encoded images are delivered (i.e., streamed) to the client device 110 for display in association with the corresponding user. For example, the user may be interacting through client device 110 with an instance of an application executing on a game processor of game server 160 in association with gameplay of a corresponding user, such as through input commands that are used to drive the gameplay. Client device 110 may receive input from various types of input devices, such as game controllers, tablet computers, keyboards, gestures captured by video cameras, mice, touch pads, audio input, etc. More particularly, an instance of the application is executed by the game title processing engine 111 and is configured for generating rendered images, which is delivered over network 150 for display at a corresponding display in association with client device 110. That is, client device 110 is configured for receiving encoded images (e.g., encoded from game rendered images generated through execution of a video game), and for displaying the images that are rendered for display. Game title processing engine 111 is able to support a plurality of applications using a plurality of game logics, each of which is selectable by the user.

In addition, system 100 includes an overlay logic 120 with functionality configured to provide haptic responses for in-game effects of corresponding video games, such as in support of the game engine 111. In that manner, the overlay logic is configured to communicate a gaming experience for a corresponding player that is rendered and/or triggered by the in-game effects of corresponding video games, such as when supporting game engines 111 executing the video games. The application of haptic responses for in-game effects may be personalized to each user through rules or via a corresponding AI model. As shown, overlay logic 120 may be located at the cloud game network 190 or may be located at the client device 110, and may be configured to support a corresponding game engine 111. For example, when the game engine 111 executing game logic of a video game is at the client device 110, then the overlay logic 120 is also located at the client device 110 and operates in support of the game engine. Also, when the game engine 111 is at the cloud game network 190, then the overlay logic 120 is also located at the cloud game network 190 operating in support of the game engine.

In some embodiment, the overlay logic 120 includes artificial intelligence (AI) to include a deep/machine learning engine 130 configured build or train and implement an AI model 135 for each of a plurality of users and/or players. In one embodiment, the AI learning model 135 is a machine learning model configured to apply machine learning to learn and/or predict which haptic responses for corresponding in-game effects are preferred by a corresponding player, and learning whether or not to apply a haptic response for a given game context, and learning at what intensity level should a corresponding haptic response be applied. In another embodiment, the AI learning model is a deep learning model configured to apply deep learning to learn preferred haptic response behavior of players, such as when translating in-game effects to corresponding haptic responses, wherein machine learning is a sub-class of artificial intelligence, and deep learning is a sub-class of machine learning. As such, artificial intelligence is used to learn which haptic responses for in-game effects are preferred by corresponding players in order to communicate gaming experiences that are rendered and/or triggered by the in-game effects. For example, a corresponding AI model 135 for a player may be implemented to provide haptic responses for certain in-game effects simultaneous with the generation of the in-game effects when the player is playing a video game.

Purely for illustration, the deep/machine learning engine 190 may be configured as a neural network used to train and/or implement the AI model 135, in accordance with one embodiment of the disclosure. Generally, the neural network represents a network of interconnected nodes responding to input (e.g., extracted features) and generating an output (e.g., learn gaming usage and/or play behavior of users and providing a recommendation). In one implementation, the AI neural network includes a hierarchy of nodes. For example, there may be an input layer of nodes, an output layer of nodes, and intermediate or hidden layers of nodes. Input nodes are interconnected to hidden nodes in the hidden layers, and hidden nodes are interconnected to output nodes. Interconnections between nodes may have numerical weights that may be used link multiple nodes together between an input and output, such as when defining rules of the AI model 135.

Figure 2:
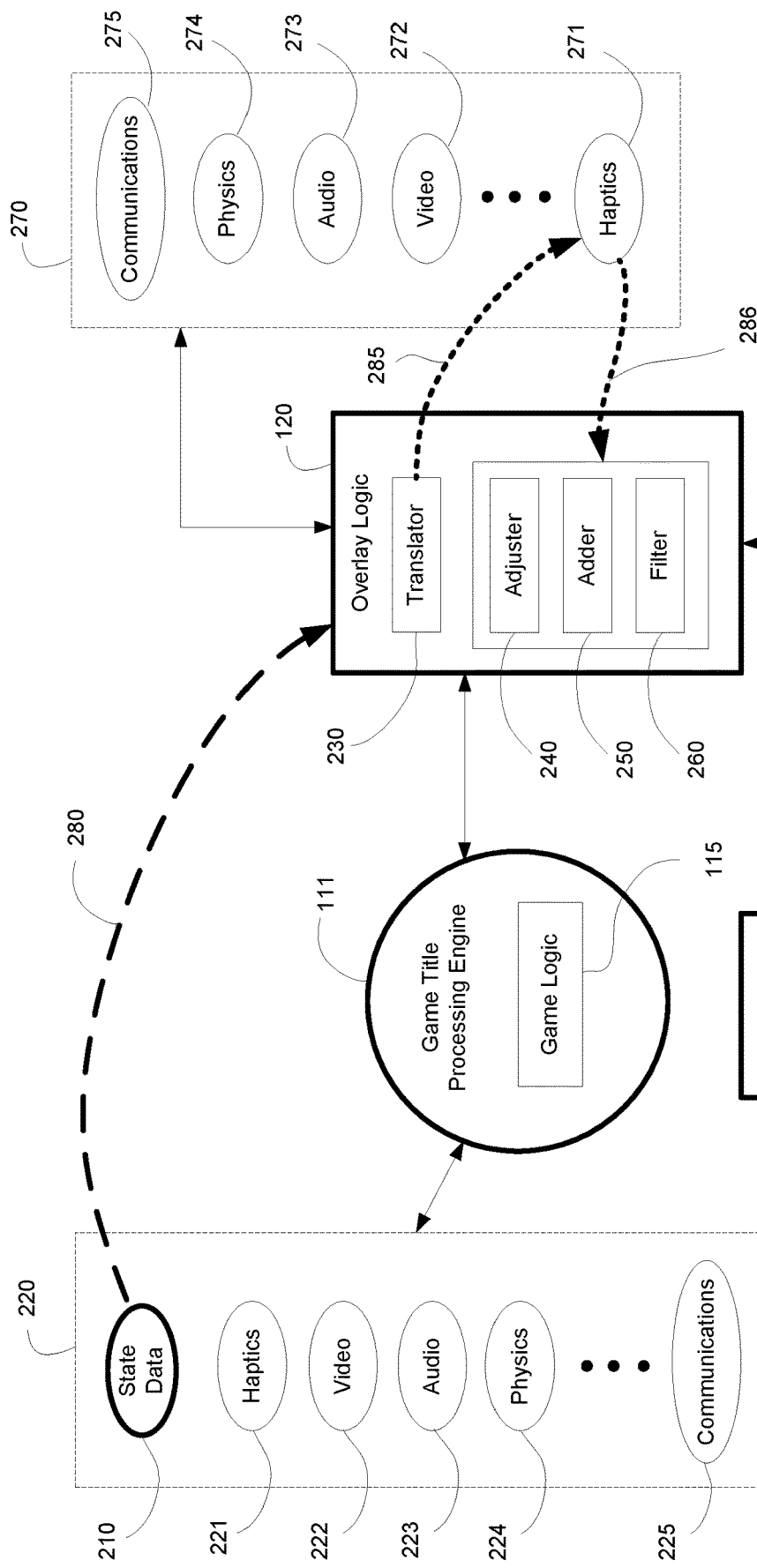
FIG. 2 illustrates overlay logic supporting a game engine to provide haptic responses for in-game effects in order to communicate gaming experiences that are rendered by the in-game effects, in accordance with one embodiment of the disclosure.

FIG. 2 illustrates overlay logic 120 supporting a game engine to provide haptic responses for in-game effects in order to communicate a gaming experience that is rendered by the in-game effects, in accordance with one embodiment of the disclosure. As shown, the overlay logic 120 supports a game title processing engine 111 that is executing game logic 115 of a corresponding video game. As previously described, the game engine 111 when executing the game logic is configured to perform game calculations, physics, geometry transformations, rendering, lighting, shading, audio, as well as additional in-game or game-related services. For example, the game engine 111 is configured to provide output 220 including, in part, haptic responses 221, video 222, audio 223, physic 224, communications 225 (in game communications with other players), etc., as previously described.

In addition, the game engine 111 is configured for generating game state data 210 wherein game state data defines the state of an executing video game at that point. For example, game state data may include game characters, game objects, game object attributes, game attributes, game object state, graphic overlays, in-game effects generated for one or more video frames, etc. In that manner, game state data allows for the generation of the gaming environment (e.g., including in-game effects, etc.) that existed at the corresponding point in the video game. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point.

As shown and previously described, overlay logic 120 supports the game engine 111. In particular, game state data 210 is delivered to and/or accessed by the overlay logic (e.g., as represented by path 280) for analysis to determine which in-game effects are being generated by the game engine 111 for a corresponding video game. The overlay logic 120 is configured to provide haptic responses for the in-game effects in order to communicate a gaming experience that is rendered and/or triggered by the in-game effects by corresponding players. The overlay logic 120 includes a translator 230, an adjuster 240, an adder 250, and a filter 260.

In particular, the overlay logic 120 may be configured to provide additional functionality in support of the game engine 111. That is, additional elements may be generated by the overlay logic and provided in support of and/or in conjunction with the video frames that are generated by the game engine 111 when executing game logic 115 of a video game. For example, the overlay logic 120 may provide as output 270 these additional elements including, in part, haptic responses 271, video 272, audio 273, physic 274, communications 275 (in game communications with other players), etc.

In one implementation, based on the in-game effects determined from game state data the translator 230 of the overlay logic 120 is configured to translate the in-game effects into corresponding haptic responses. For example translator 230 is able to determine and/or output haptic responses 271 for corresponding in-game effects as represented by path 285. In one embodiment, translator 230 implements an AI model for a corresponding player to translate in game effects to corresponding haptic responses.

In particular, FIG. 3 is a chart 300 illustrating the translation of in-game effects to haptic responses, and the application of filter and adjuster functions when implementing overlay logic supporting a game engine to provide haptic responses for in-game effects in order to communicate gaming experiences that are rendered by the in-game effects. As shown in FIG. 3, the translation function 230A may be implemented by translator 230 to translate in-game effects into corresponding haptic responses. For example, column 320 includes in-game effects 1 through N that may be generated for video frames of one or more video games. Row 310 shows haptic responses 1 through N that can be translated for the in-game effects 1 through N. Each of the haptic responses 1 through N may be a unique pattern of vibrations provided by an actuator in a user device of a player. For example and purely for illustration, in-game effect "1" is translated to haptic response 3; in-game effect "2" is translated to haptic response 2; in-game effect "3" is translated to haptic responses 3 and 4; in-game effect "4" is translated to haptic response 1; in-game effect "5" is translated to haptic response 2; in-game effect "6" is translated to haptic response 3 and haptic response N; . . . and in-game effect "N" is translated to haptic response 3.

As shown, a haptic response may be used as translations for one or more in-game effects. For example, each of in-game effects 1, 3, 6, and N may be translated into haptic response 3. Also, an in-game effect may be translated into one or more haptic responses. For example, in-game effect 3 is translated into haptic responses 3 and 4, and in-game effect 6 is translated into haptic response 3 and haptic response N. In those cases, more than one haptic response may be actuated in relation to corresponding in-game effects.

Returning back to FIG. 2, once the haptic responses 271 are determined, additional functionality is performed by the overlay logic 120, as represented by path 286. For example, the overlay logic 120 may include a filter 260 that is configured to determine whether a translated haptic response for a corresponding in-game effect should be filtered based on preferences as included in a user profile 290. In one embodiment, the filtering function provided by filter 260 is learned by the corresponding AI model 135, wherein the user profile 290 may include one or more elements of the AI model or provide access to the AI model. In other embodiments, the filtering function is provided through application of rules and/or relational tables. For example, chart 300 of FIG. 3 includes a filter function 260A that may be implemented by filter 260. As shown, haptic effects 1-N that are available for translation for one or more in-game effects may be further filtered, as indicated by a "1" to remain or "0" for filtering out. As shown, haptic responses 1, 2, and N have corresponding values of "1", and as such will be produced simultaneously with one or more video frames including the in-game effects. The in-game effects may be produced with the video frames, or may be suppressed by the player (e.g., turn volume down or off, throttled down, etc.), or may not be presented along with the corresponding video frames. Also, haptic responses 3 and 4 have corresponding values of "0", and as such will not be produced (i.e., filtered out) simultaneously with one or more video frames including the in-game effects. That is, these haptic responses 3 and 4 have been filtered out by the corresponding player. For example, the player may prioritize other haptic responses, or dislikes these haptic responses.

In addition, the overlay logic 120 may include an adder 250 that is configured to add a haptic response that is translated for a corresponding in-game effect simultaneous with one or more video frames that are associated with the corresponding in-game effect. That is, once it is determined that the haptic response for a corresponding in-game effect has not been filtered out by the filter 260, the adder 250 generates and/or sends instructions to an actuator of a corresponding device of the player to produce the haptic response. As shown, the adder 250 may be implemented to actuate haptic responses 1, 2, and N for corresponding in-game effects for a particular player. For example, the instruction may be used to actuate a certain vibrational pattern of an actuator in a hand held controller.

Also, the overlay logic 120 may include an adjuster 240 that is configured to determine whether a translated haptic response for a corresponding in-game effect should be adjusted based on preferences as included in a user profile 290. More specifically, the adjuster 240 determines which intensity level should be applied to the corresponding haptic response that is translated for a given in-game effect. That is, once it is determined that the haptic response for a corresponding in-game effect has not been filtered out by the filter 260, the adjuster 240 determines at what intensity level should the haptic response be actuated by the corresponding actuator of a user device (e.g., hand held controller, actuator worn by user, head mounted display, seat, seat pad, any device that includes a controllable actuator, etc.). For example, the adjuster function may raise, lower, or maintain an assigned or default level of intensity for the corresponding haptic response. In one embodiment, the adjusting function provided by the adjuster 240 is learned by the corresponding AI model 135, wherein the user profile 290 may include one or more elements of the AI model or provide access to the AI model. In other embodiments, the adjusting function is provided through application of rules and/or relational tables. For example, chart 300 of FIG. 3 includes an adjuster function 240A that may be implemented by adjuster 240. As shown, when haptic responses 1, 2, and N are actuated for corresponding in-game effects for a particular player, the adjuster 240 is implemented to determine the appropriate intensity level for the corresponding haptic response. For example, when haptic response "1" is translated and passes the filter application, haptic response "1" is actuated at an intensity level of 3 on a scale of 1 to 5, for example, wherein 5 is the highest intensity level. Also, when haptic response "2" is translated and passes the filter application, haptic response "2" is actuated at an intensity level of 5, the highest intensity level. Further, when haptic response "N" is translated and passes the filter application, haptic response "N" is actuated at an intensity level of 1, the lowest intensity level of actuation. Intensity levels may not be provided or given an intensity level of "0" for haptic responses 3 and 4 for the given player as these haptic responses have been filtered out.

Figure 4:
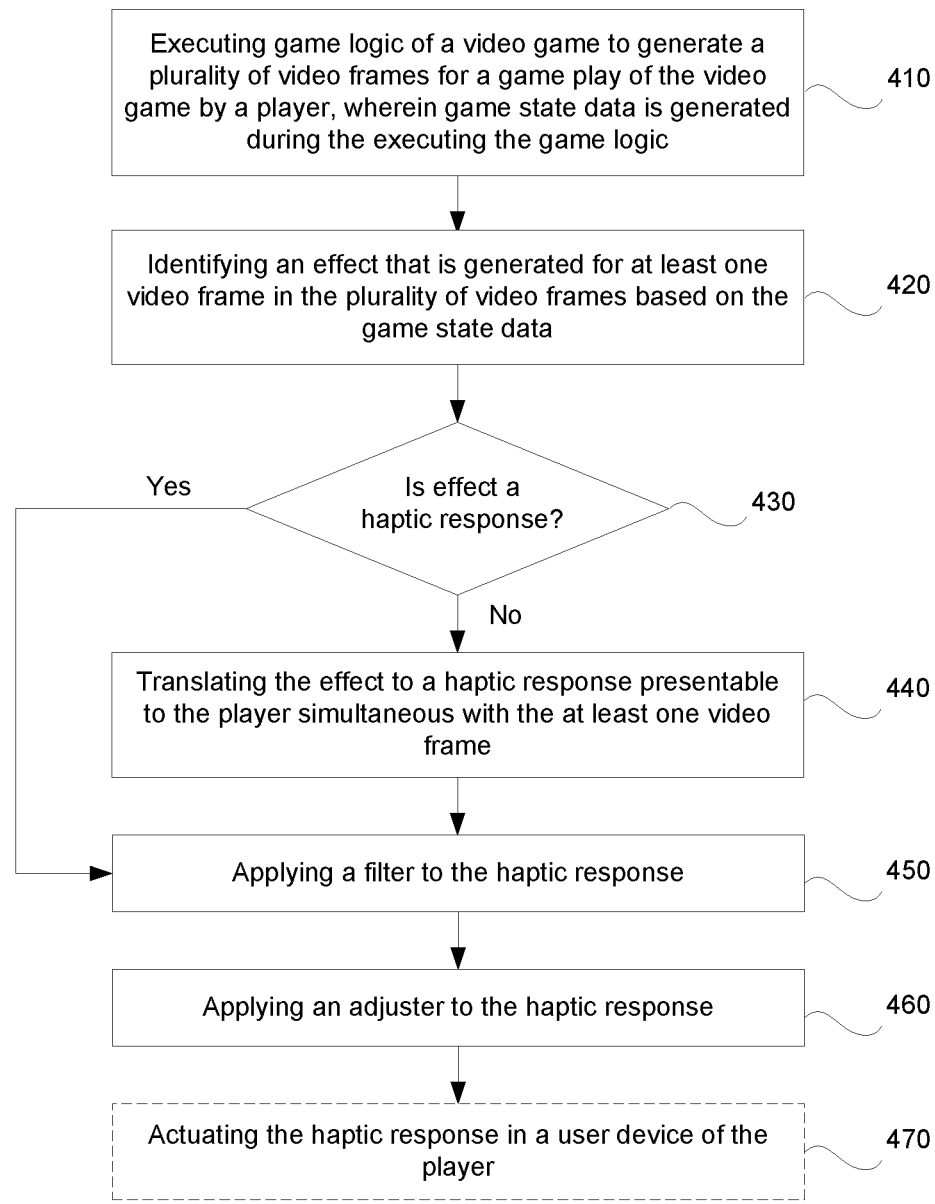
FIG. 4 is a flow diagram illustrating steps in a method configured for providing overlay logic supporting a game engine to provide haptic responses for in-game effects in order to communicate gaming experiences that are rendered by the in-game effects, in accordance with one embodiment of the disclosure.

With the detailed description of the system 100 of FIG. 1 and the overlay logic 120 of FIG. 2, flow diagram 400 of FIG. 4 discloses a method for providing haptic responses for in-game effects, in accordance with one embodiment of the disclosure. The operations performed in flow diagram 400 may be implemented by one or more of the entities previously described components, and also system 100 described in FIGS. 1 and 2, including overlay logic 120. In particular, the method of flow diagram 400 may be implemented in order to provide additional avenues to communicate gaming experiences to players that are rendered and/or triggered by in-game effects of one or more video games. For example, haptic responses may be produced in support of and simultaneous with generation of corresponding in-game effects, wherein the in-game effects may also be provided to the player or suppressed. In that manner, players that may be impaired (e.g., voluntarily or involuntarily) can now have the same or similar gaming experiences via the haptic responses that may have been provided with corresponding in-game effects. For illustration, a hearing impaired player that has difficulty in hearing sound effects generated by a corresponding video game can gain the same gaming experience associated with the in-game effects through generation of corresponding haptic responses.

At 410, the method includes executing game logic of a video game to generate a plurality of video frames for a game play of the video game by a player. For example, a game engine is configured to execute the game logic in support of the game play. During execution of the game logic, game state data is also generated. As previously described, game state data defines the state of an executing video game at that point, and in part, game state data allows for the generation of the gaming environment that existed at the corresponding point in the video game. In one embodiment, the game state data provides information about the in-game effects being generated for the plurality of video frames.

At 420, the method includes identifying an effect that is generated for at least one video frame in the plurality of video frames based on the game state data. In particular, the game engine generates the video frames, which includes generating the effects, such as in-game effects, that are provided within the video frames. For example, the effects may include sound effects, visual effects, or any other types of effects that are generated with the video frames.

At decision step 430, the method determines if the effect is a haptic response. If the effect is a haptic response, additional actions may be performed on the haptic response, as provided by operation 450. For example, the overlay logic may be configured to perform these actions on the haptic response that were not originally provided during execution of the game logic. As will be described more fully below, the haptic response may be filtered as provided in operation 450, or the intensity level when presenting the haptic response may be adjusted as provided in operation 460.

On the other hand, if the method determines that the effect is not a haptic response, then the method proceeds to 440 in order to translate the effect to a haptic response. The haptic response is communicating a gaming experience that is rendered by the effect in the at least one video frame. The haptic response is presented to the player simultaneous with the at least one video frame. In one embodiment, the haptic response is presented simultaneous with the effect. In other embodiments, the effect may be suppressed, such that that haptic response is presented without the effect, or with a suppressed effect. For example, when the effect is a sound effect even though the sound effect is presented, a hearing impaired player may not hear the sound effect. Also, a player may purposefully play a video game without sound or sound effects. For example, that player may not be able to concentrate on playing the game with too many sound effects or with sound.

In one embodiment, the translation is performed when a level of intensity of the effect is above a threshold. The threshold may indicate at what point the player would like a haptic response to be generated for or in combination with presentation of the effect. That is, if the level of intensity is below the threshold, the effect may be performed without any haptic response. On the other hand, if the level of intensity meets or exceeds the threshold, then a translation of the effect to a haptic response is performed. In some embodiments, the level of intensity could be zero (0), wherein the translation is performed no matter the level of intensity.

As previously described, the translation of effects into haptic responses may be personalized to the player. For example, an AI model of the player may be configured to learn the haptic responses preferred by the player for corresponding effects. In that case, during translation, the method includes executing an AI model of the player, wherein the AI model is configured to translate a plurality of effects generated from a plurality of video games into a plurality of haptic responses. For example, the AI model can translate a sound effect generated during execution of game logic of a video game into a preferred haptic response, such as a particular vibration pattern of an actuator in a hand held controller.

At 450, the method includes applying a filter function to the haptic response. The filter function determines whether the haptic response will be applied or presented to the player. For example, the player may indicate via a user profile or it may be learned through application of the AI model that the player may not want certain haptic responses to be presented at any time. In another example, the user profile of the player may indicate that the player prefers to block usage of a particular haptic response, and in that case, the filter function would filter out presentation of that haptic response. In other embodiments, the filter function is performed when the haptic response exceeds a threshold. For example, when the level of intensity of the haptic response exceeds the threshold, the filter function may be applied. The threshold may be at level zero (0). When the level of intensity is exceeded, the player may wish to have the haptic response filtered out. As such, the filter function determines whether or not to present a haptic response that has been translated.

At 460, the method includes applying an adjuster function to the haptic response. That is, additional actions may be performed on a haptic response that has survived the filter function. For example, a level of intensity of the haptic response may be determined and/or adjusted. For example, the level of intensity may be adjusted higher or lower from a default or determined level of intensity. As such, the proper level of intensity is determined when presenting the haptic response. In some cases, the adjustment is determined based on a user profile of a player, and in other cases the adjustment could be determined based on the AI model of the player.

For example, in some cases the player may wish to have a haptic response for a corresponding effect. However, the player may wish to have the haptic response presented up to a certain level of intensity. In that case, the haptic response may be suppressed such that the haptic response is only presented up to a certain level of intensity. In some cases, when the level of intensity of a haptic response cannot be lowered below a desired level, the haptic response may be filtered out.

At 470, the method optionally includes actuating the haptic response in a user device of the player. That is, the haptic response is presented to the player via a device, such as a hand held controller, or a head mounted display (HMD), or a seat pad, or a seat, or an actuator worn by the player, or any device that is able to interface with the player. In one embodiment, the method includes sending an instruction to the device of the player to actuate the haptic response simultaneous with the at least one video frame associated with the effect.

In one embodiment, the method includes identifying a plurality of effects that is generated for the at least one video frame in the plurality of video frames based on the game state data. The plurality of effects is translated into a plurality of haptic responses, wherein the haptic responses are presentable to the player simultaneous with the at least one video frame. In one embodiment, the plurality of haptic responses includes a plurality of vibrational patterns actuated in a device of the player. For example, the actuator may provide a buzzing sensation to the player through a hand held controller.

In one embodiment, when there are multiple haptic responses presented to the player for the plurality of effects, one haptic response may be prioritized over another haptic response. That is, a first haptic response is prioritized over a second haptic response. In that case, the second haptic response may be removed or a level of intensity of the second haptic response may be lowered based on a user profile of the player or AI model of the player.

Figure 5:
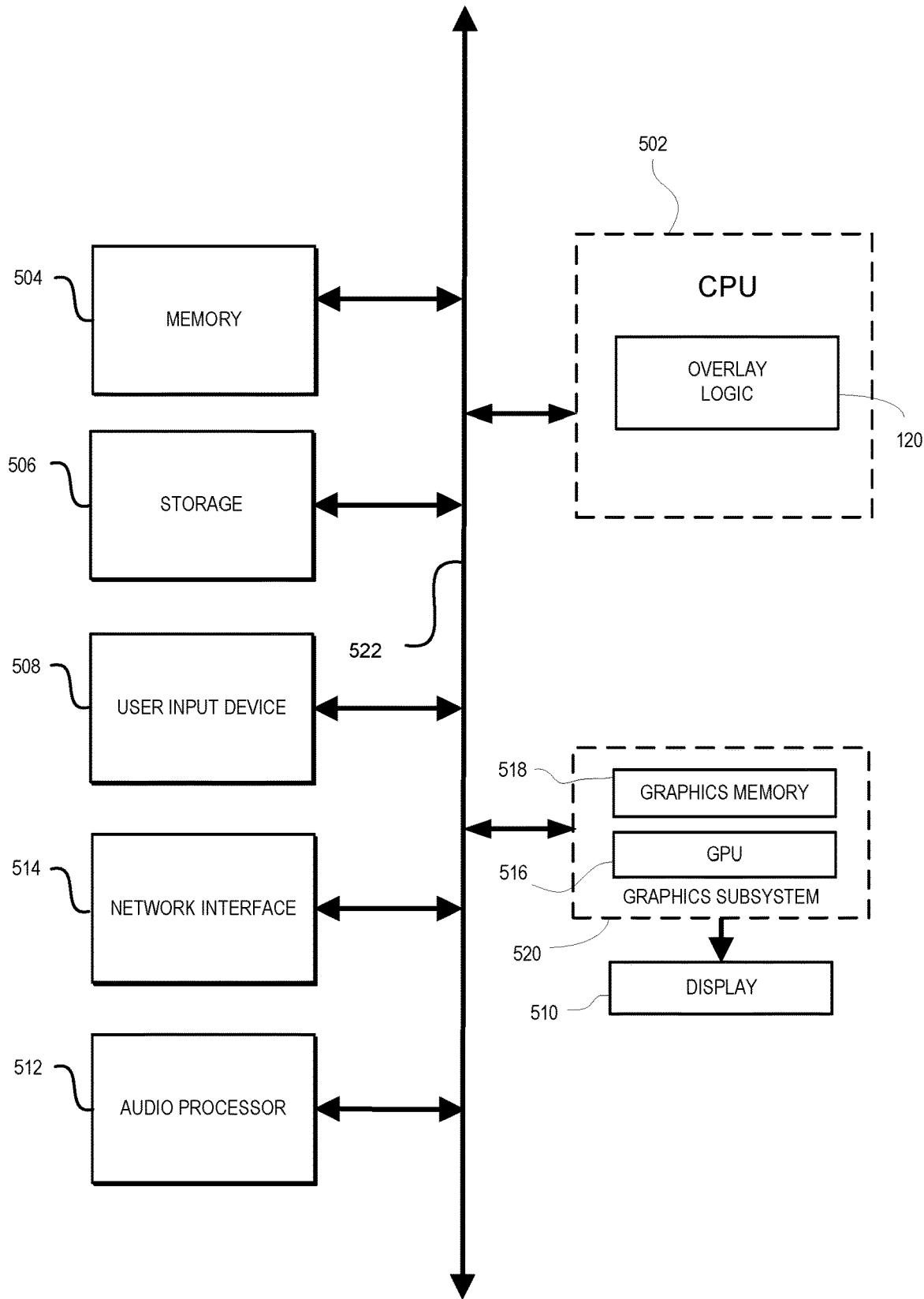
FIG. 5 illustrates components of an example device that can be used to perform aspects of the various embodiments of the present disclosure.

FIG. 5 illustrates components of an example device 500 that can be used to perform aspects of the various embodiments of the present disclosure. This block diagram illustrates a device 500 that can incorporate or can be a personal computer, video game console, personal digital assistant, a server or other digital device, suitable for practicing an embodiment of the disclosure. Device 500 includes a central processing unit (CPU) 502 for running software applications and optionally an operating system. CPU 502 may be comprised of one or more homogeneous or heterogeneous processing cores. For example, CPU 502 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 500 may be a localized to a player playing a game segment (e.g., game console), or remote from the player (e.g., back-end server processor), or one of many servers using virtualization in a game cloud system for remote streaming of gameplay to clients, or for implementing additional services such as a supervisor functionality.

In particular, CPU 502 may be configured to implement overlay logic 120 with functionality configured to provide haptic responses for in-game effects in order to communicate a gaming experience that is rendered by the in-game effects, such as to communicate a gaming experience that is rendered and/or triggered by the in game effects in players. In that manner, a player that may be impaired in receiving an intended gaming experience when playing a video game can receive a full gaming experience through the use of haptic responses substituted for or in support of in-game effects of a video game.

Memory 504 stores applications and data for use by the CPU 502. Storage 506 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 508 communicate user inputs from one or more users to device 500, examples of which may include keyboards, mice, joysticks, touch pads, touch screens, still or video recorders/cameras, tracking devices for recognizing gestures, and/or microphones. Network interface 514 allows device 500 to communicate with other computer systems via an electronic communications network, and may include wired or wireless communication over local area networks and wide area networks such as the internet. An audio processor 512 is adapted to generate analog or digital audio output from instructions and/or data provided by the CPU 502, memory 504, and/or storage 506. The components of device 500, including CPU 502, memory 504, data storage 506, user input devices 508, network interface 510, and audio processor 512 are connected via one or more data buses 522.

A graphics subsystem 520 is further connected with data bus 522 and the components of the device 500. The graphics subsystem 520 includes a graphics processing unit (GPU) 516 and graphics memory 518. Graphics memory 518 includes a display memory (e.g., a frame buffer) used for storing pixel data for each pixel of an output image. Graphics memory 518 can be integrated in the same device as GPU 516, connected as a separate device with GPU 516, and/or implemented within memory 504. Pixel data can be provided to graphics memory 518 directly from the CPU 502. Alternatively, CPU 502 provides the GPU 516 with data and/or instructions defining the desired output images, from which the GPU 516 generates the pixel data of one or more output images. The data and/or instructions defining the desired output images can be stored in memory 504 and/or graphics memory 518. In an embodiment, the GPU 516 includes 3D rendering capabilities for generating pixel data for output images from instructions and data defining the geometry, lighting, shading, texturing, motion, and/or camera parameters for a scene. The GPU 516 can further include one or more programmable execution units capable of executing shader programs. In one embodiment, GPU 516 may be implemented within an AI engine (e.g., machine learning engine 190) to provide additional processing power, such as for the AI, machine learning functionality, or deep learning functionality, etc.

The graphics subsystem 520 periodically outputs pixel data for an image from graphics memory 518 to be displayed on display device 510. Display device 510 can be any device capable of displaying visual information in response to a signal from the device 500, including CRT, LCD, plasma, and OLED displays. Device 500 can provide the display device 510 with an analog or digital signal, for example.

In other embodiments, the graphics subsystem 520 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river) operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, in various embodiments the present disclosure describes systems and methods configured for providing haptic responses for in-game effects in order to communicate a gaming experience that is rendered and/or triggered by the in-game effects for corresponding players.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

Access to the cloud gaming network by the client device may be achieved through a communication network implementing one or more communication technologies. In some embodiments, the network may include 5th Generation (5G) network technology having advanced wireless communication systems. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in the prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g., tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:
    executing on a game server game logic of a video game to generate a plurality of video frames for a game play of the video game by a player, wherein game state data is generated during the executing the game logic;
    identifying by the game server an effect that is generated for at least one video frame in the plurality of video frames based on the game state data; and
    translating by the game server the effect to a haptic response,
    wherein the haptic response is presented to the player simultaneous with presentation of the at least one video frame to communicate a gaming experience that is rendered by the effect in the at least one video frame.

2. The method of claim 1, further comprising:
    sending an instruction to a device of the player to actuate the haptic response simultaneous with the at least one video frame.

3. The method of claim 2, wherein the device of the player includes at least one of:
a hand held controller; or
a head mounted display; or
a seat pad; or
a seat; or
an actuator worn by the player.

4. The method of claim 1, wherein the effect includes at least one of:
a sound effect; or
a visual effect.

5. The method of claim 1, further comprising:
determining that the player has blocked usage of the haptic response based on a user profile of the player; and
filtering out the haptic response.

6. The method of claim 1, further comprising:
adjusting a level of intensity when presenting the haptic response based on a user profile of a player.

7. The method of claim 1, wherein the translating the effect to the haptic response includes:
executing an AI model of the player configured to translate a plurality of effects generated from a plurality of video games into a plurality of haptic responses.

8. The method of claim 1, further comprising:
identifying a plurality of effects that is generated for the at least one video frame in the plurality of video frames based on the game state data; and
translating the plurality of effects to a plurality of haptic responses presentable to the player simultaneous with the at least one video frame, wherein the plurality of haptic responses includes a plurality of vibrational patterns actuated in a device of the player;
prioritizing a first haptic response over a second haptic response,
wherein the second haptic response is removed or a level of intensity of the second haptic response is lowered based on a user profile of the player.

9. The method of claim 1, further comprising:
detecting that the effect exceeds a threshold.

10. The method of claim 9, further comprising:
filtering the effect from the at least one video frame, wherein the filtering includes at least one of:
removing the effect from the at least one video frame; and
throttling the effect to a lower intensity level in the at least one video frame.

11. A non-transitory computer-readable medium storing a computer program for performing a method, the computer-readable medium comprising:
program instructions for executing game logic of a video game to generate a plurality of video frames for a game play of the video game by a player, wherein game state data is generated during the executing the game logic;
program instructions for identifying an effect that is generated for at least one video frame in the plurality of video frames based on the game state data; and
program instructions for translating the effect to a haptic response presentable to the player simultaneous with the at least one video frame,
wherein the haptic response is communicating a gaming experience that is rendered by the effect in the at least one video frame.

12. The non-transitory computer-readable medium of claim 11, wherein in the method the effect includes at least one of:
a sound effect; or
a visual effect.

13. The non-transitory computer-readable medium of claim 11, further comprising:
program instructions for determining that the player has blocked usage of the haptic response based on a user profile of the player; and
program instructions for filtering out the haptic response.

14. The non-transitory computer-readable medium of claim 11, further comprising:
program instructions for adjusting a level of intensity when presenting the haptic response based on a user profile of a player.

15. The non-transitory computer-readable medium of claim 11, wherein the program instructions for translating the effect to the haptic response includes:
program instructions for executing an AI model of the player configured to translate a plurality of effects generated from a plurality of video games into a plurality of haptic responses.

16. A computer system comprising:
a processor;
memory coupled to the processor and having stored therein instructions that, if executed by the computer system, cause the computer system to execute a method, comprising:
executing game logic of a video game to generate a plurality of video frames for a game play of the video game by a player, wherein game state data is generated during the executing the game logic;
identifying an effect that is generated for at least one video frame in the plurality of video frames based on the game state data; and
translating the effect to a haptic response presentable to the player simultaneous with the at least one video frame,
wherein the haptic response is communicating a gaming experience that is rendered by the effect in the at least one video frame.

17. The computer system of claim 16, wherein in the method the effect includes at least one of:
a sound effect; or
a visual effect.

18. The computer system of claim 16, the method further comprising:
determining that the player has blocked usage of the haptic response based on a user profile of the player; and
filtering out the haptic response.

19. The computer system of claim 16, the method further comprising:
adjusting a level of intensity when presenting the haptic response based on a user profile of a player.

20. The computer system of claim 16, wherein in the method the translating the effect to the haptic response includes:
executing an AI model of the player configured to translate a plurality of effects generated from a plurality of video games into a plurality of haptic responses.

* * * * *